(No Model.)

W. E. WILLIAMS.
WIND WHEEL.

No. 327,370. Patented Sept. 29, 1885.

WITNESSES
J. F. White.
Chas. E. Barber.

INVENTOR
William E. Williams.
per O. E. Duffy
Attorney

United States Patent Office.

WILLIAM ERASTUS WILLIAMS, OF INDEPENDENCE, IOWA.

WIND-WHEEL.

SPECIFICATION forming part of Letters Patent No. 327,370, dated September 29, 1885.

Application filed April 5, 1884. (No model.)

*To all whom it may concern:*

Be it known that I, WILLIAM ERASTUS WILLIAMS, of Independence, in the county of Buchanan and State of Iowa, have invented a new and useful Improvement in Windmills, of which the following is a specification.

My invention relates to that class of windmills wherein the wheel revolves in a vertical plane.

The object of my invention is to provide a wheel that will receive the maximum power from the force of the wind.

Figure 1:
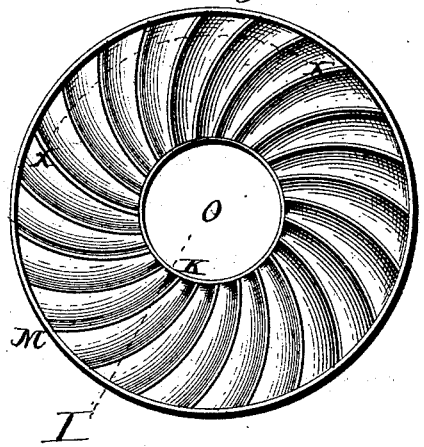
Figure 2:
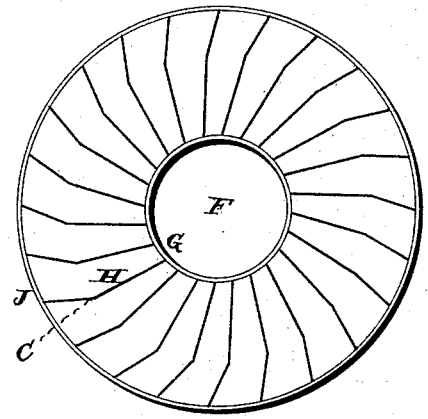
Figure 3:
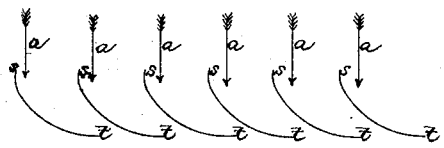
Figure 4:
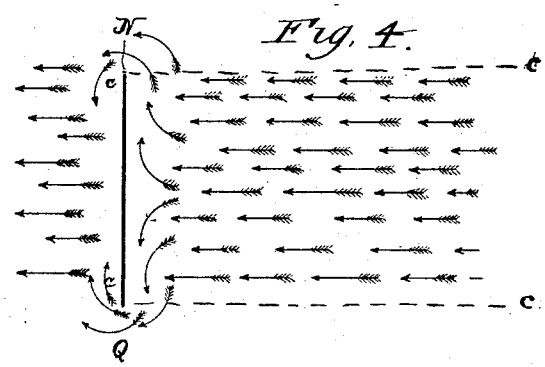
Figure 5:
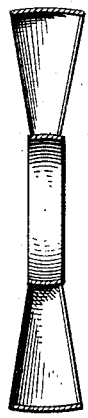
Figure 6:
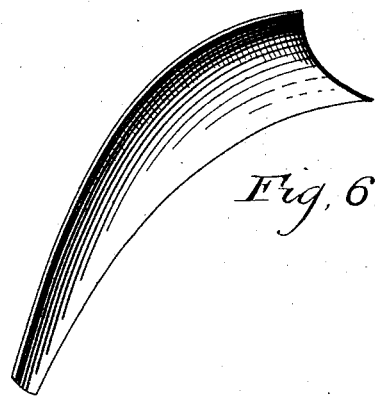

Reference is to be had to the accompanying drawings. Figure 1 is a perspective of my wind-wheel. Fig. 2 is a modification with the blades formed with an angle. Fig. 3 is a cross-section of the blades on line $x\ x$, Fig. 1. Fig. 4 represents the natural course of the wind and the manner in which it turns as it approaches a wind-wheel. Fig. 5 is a cross-section on a line passing through the center of Fig. 1. Fig. 6 is a perspective of one of the blades.

N Q represent the face of the wheel. The space within the dotted lines $c\ c\ c\ c$ represents the body of the wind that advances toward the wheel. It is evident that the speed of that portion of the wind is retarded by having to pass through the wheel, and as all the wind advances at about the same rate of speed, some of that body of the wind between the dotted lines $c\ c\ c\ c$ must pass around the wheel, as is shown by the arrows in Fig. 4, and the direction of the greater portion of the wind that passes through the wheel is not perpendicular to the face of the wheel, but diverging outward, and the fan or sail to receive that diverging force must be set angularly or curved from the radius of the wheel in such a manner as to receive that force.

A better result is obtained by setting the outer portion of the slat at a greater angle to the radius than the inner portion, as in Fig. 2, where G H J is the slat and C F the radius. The maximum result is obtained by curving the slat from the radius, as in Fig. 1, where K M is the slat and I O the radius.

A transverse section of the slats on the line $x\ x$ is shown at Fig. 3.

In regard to the blades, the form of each may be further described as that of the segment of a hollow truncated cone having a curved axis—that is, the blade is concavo-convex in section both longitudinally and transversely, and tapering in width from its outer to its inner end, and thus formed is set, as to its width, at an angle of, say, forty-five degrees, so that the wheel shall best receive its motion with its face directly to the wind, and the curvature of the blades is nearly or quite equal to the curvature of the circle of the outer rim. These curves, if produced, would pass nearly through the axis of the wheel. As, however, they are not so produced, they may be described as set upon lines oblique to the radii of the circle of the wheel.

$s\ t$ is curved corresponding to one-half of a cycloid. The base of the cycloid is within the forward plane of the wheel, and the diameter of the generating circle is the thickness or depth of the wheel. The wind advances on the concave side of the slats in the direction of the arrows $a$, and in coming in contact with the slats or sails it is turned gently at first and accelerated as it passes through and leaves the wheel parallel to the face of the wheel and tangent to the curve of the slat. The result thus obtained is to receive the wind on the wheel without a deadening shock, which would be occasioned if the surface was more abrupt at the first point of contact, and at the same time a greater resultant is produced in the direction of the wheel's revolution. Any curve other than the one described transversely of the slat, whereby the wind would be received on the concave side, would give a similar result; but the cycloid gives the maximum.

I am aware that a wind-wheel has been built wherein all the wind was forced to pass around the wheel and the power derived by the wind coming in contact with spirally curved sails in so doing; also, windmills have been built with the outer edge of the sails cut away in the form of a curve that would give them a similar appearance to my invention, but in reality and effect widely different; also, windmill-sails have been curved to give them a greater angle to the face of the wheel at the center of the wheel than at the circumference; also, the slats have been set in the wheel parallel to the radius of the wheel and curved transversely of the slat. All of such I do not claim; but What I do claim as my invention, and desire to secure by Letters Patent, is—

1. A blade for wind-wheels, concavo-convex in section both longitudinally and transversely and tapering in outline.

2. The combination of the outer rim, the inner rim, and the blades, said blades being concavo-convex in section lengthwise and transversely and tapering in outline.

3. The combination of the outer rim, the inner rim, and the blades, said blades being concavo-convex in section both lengthwise and transversely and secured in position oblique both to the axis and to the radii of the windwheel.

WILLIAM ERASTUS WILLIAMS.

Witnesses:
H. C. MARKHAM,
J. H. WILLIAMSON.